United States Patent Office
3,499,924
Patented Mar. 10, 1970

3,499,924
PROCESS FOR THE MANUFACTURE OF AN-
HYDROUS SOLUTIONS OF PERACETIC ACID
Kurt Sennewald, Wilhelm Vogt, and Lothar Strie, Knap-
sack, near Cologne, and Heinrich Rehberg, Hermul-
heim, near Cologne, Germany, assignors to Knapsack
Aktiengesellschaft, Knapsack, near Cologne, Germany,
a corporation of Germany
No Drawing. Filed Dec. 28, 1966, Ser. No. 605,159
Claims priority, application Germany, Jan. 19, 1966,
K 58,177
Int. Cl. C07c 73/12
U.S. Cl. 260—502   9 Claims

ABSTRACT OF THE DISCLOSURE

Explosion-proof process for making anhydrous solutions of peracetic acid by the oxidation, with thorough mixing, of an acetaldehyde solution with at least the equivalent quantity of oxygen at elevated temperatures and under pressure. The peracetic acid solutions are obtained in improved yields within short reaction periods.

The present invention relates to a process for the manufacture of anhydrous solutions of peracetic acid, wherein acetaldehyde is oxidized by means of oxygen or an oxygen-containing gas, in the liquid phase, at elevated temperatures and under pressure.

German Patent 1,165,009 describes a process for the manufacture of mixtures containing peracetic acid, wherein acetaldehyde diluted with an organic solvent is oxidized by means of oxygen or air in the presence of a small amount of an iron, nickel, cobalt or copper salt, at a temperature of —10 to +60° C. These mixtures contain peracetic acid and in addition thereto they always contain a certain proportion of acetic acid or acetic anhydride, which is obtained in a secondary reaction via a peradduct formed of peracetic acid and unreacted acetaldehyde. The addition of a heavy metal salt to the starting mixture is known to accelerate the formation of peracetic acid, but it also favors the decomposition of peracetic acid formed previously. Attempts have already been made to obviate the negative influence of heavy metal salts on peracetic acid. To this end, it has been proposed to interrupt the oxidation of the acetaldehyde as soon as an about 50% proportion thereof has undergone conversion, the oxidation being interrupted by inactivating the heavy metal salts, e.g. by means of polyphosphates, and thereafter distilling the peracetic acid-containing reaction mixture to free it from unreacted acetaldehyde.

Unless inactivated, the heavy metal salt catalysts used in this process give rise, after a certain reaction period, to the formation of relatively large amounts of by-products, which is disadvantageous. The suggestion that the oxidation reaction be interrupted after conversion of about 50% of the aldehyde used, by inactivation of the catalyst also failed to produce substantial commercial advantages. By inactivation of the heavy metal salts, it is possible to prevent the peracetic acid from undergoing decomposition, but it is impossible to obviate the reaction between equivalent quantities of peracetic acid and acetaldehyde with the resultant formation of the very unstable acetaldehyde monoperacetate. This means in other words that the performance of the process on an industrial scale is jeopardized.

In British Patent 892,631 it is proposed to prepare peracetic acid by the reaction of acetaldehyde with oxygen in the presence of a heavy metal salt catalyst, the reaction being carried out in the gas phase at a temperature of 80–200° C. The reactants are allowed to remain in the reaction chamber for a period of about 5 to 30 seconds. These conditions imply using the acetaldehyde in a large excess with respect to the quantity of oxygen present, i.e. in a proportion 12 times that of the oxygen, in order to prevent the reaction from taking an explosion-like course and to avoid total oxidation of the acetaldehyde. After the reaction, relatively large amounts of acetaldehyde in excess are required to be separated from the peracetic acid formed, which is disadvantageous.

It has now unexpectedly been found that even at temperatures higher than 60° C., which imply using specific conditions, acetaldehyde is oxidizable, in the liquid phase by means of oxygen or an oxygen-containing gas, into peracetic acid, without the acid being subject to decomposition. Contrary to expectation, the oxidation reaction carried out at temperatures above 60° C., was found to produce, per 100 parts peracetic acid, undesirable acetic acid as a by-product in a proportion substantially lower than that obtained by oxidation at temperatures lower than 60° C.

The present process for the manufacture of anhydrous solutions of peracetic acid by the oxidation of acetaldehyde by means of oxygen or an oxygen-containing gas in the presence of an inert solvent, in the liquid phase, at elevated temperature and under pressure, comprises more especially oxidizing, with thorough mixing, an acetaldehyde solution with at least the equivalent quantity of oxygen or an oxygen-containing gas, at a tempeurature higher than 60° C. up to about 110° C. and under a pressure higher than 1 atmosphere gauge, thereafter cooling the reaction mixture down to a temperature at which the content of solvent vapors in the oxygen-containing off-gas is below the lower limit of ignition of the solvent, which is present in admixture with oxygen, and, if desired, distilling the cooled reaction mixture to free it from small proportions of unreacted acetaldehyde, or stabilizing the mixture by means of a conventional stabilizer.

The acetaldehyde should conveniently be oxidized at a temperature of about 70 to 90° C. It has furthermore been found advantageous in the present process to use a pressure which is preferably maintained between about 2 and 4 atmospheres gauge. In accordance with a further feature of the present invention, a turbulent flow, corresponding to a Reynold number of at least 10,000, is conferred upon the starting mixture to ensure intimate contact of the reaction components. The solvents useful for dissolving the acetaldehyde include, for example ethyl acetate, acetone or methylethylketone. The oxidation period should conveniently be limited in time. This ensures the obtainment of good yields of peracetic acid under the above conditions, and substantially prevents acetaldehyde from undergoing total oxidation. The sojourn time of the reaction mixture in the reaction chamber is so selected that no more than 5% of the acetaldehyde undergoes total oxidation. This is warranted when the reaction mixture remains in the reaction chamber for a period between about 30 seconds and 10 minutes, at a temperature of about 60 to 110° C. under a pressure of about 0.1 to 20 atmospheres gauge. At a temperature of 70 to 90° C. under a pressure of 2 to 6 atmospheres gauge, the sojourn time varies between about 1 and 2 minutes. After the reaction is complete, the reaction mixture should conveniently be cooled down to a temperature lower than 20° C., preferably to a temperature of —10 to +5° C.

The process of the present invention offers various advantages as compared with the art. The omission of heavy metal salt catalysts in the present process results in the molar ratio of peracetic acid to acetic acid being displaced so as to favor the formation of peracetic acid. For example, a mixture containing peracetic acid, acetic acid and in addition thereto acetaldehyde peracetate in the molar ratio of 65:20:15 is obtained in German Patent 1,127,342. In the present invention, however, only peracetic acid and acetic acid are obtained in the molar ratio of 79:21. The peracetic acid solution is free from catalysts and can therefore more readily be re-used in the absence of sometimes disturbing catalyst influences. A further advantage resides in the use of temperatures higher than 60° C. which influence the period necessary for reaction of the acetaldehyde. At 80° C., the reaction period is found to be only ⅛ of the time needed at about 50° C., which is conventional, and the acetaldehyde undergoes almost complete conversion into peracetic acid, whereas the conversion rate is not higher than 71% at a temperature say of 30 to 35° C. The explosion-proof execution of the present process by cooling the reaction mixture down to a temperature lower than 20° C., is a further advantage which advances the art.

EXAMPLE 8 kg. of an acetaldehyde solution of 19% strength by weight in ethyl acetate and 40 grams of peracetic acid-containing final product, which were recycled, were continuously introduced, per hour, into a flow reactor formed of a spiral, double-walled tube of stainless steel and 70 meters long. The reactor was also fed with 730 normal liters oxygen contaminated with about 1% nitrogen, under a pressure of 7 atmospheres.

The reactor had an inner diameter of 4 mm. The outer cooling jacket of the reactor was subdivided in 4 cooling sections of equal length, i.e. of 16 meters each, and in a further section 6 meters long. In the individual cooling sections, the reaction heat evolved inside the reactor was dissipated at varying rates. The reaction chamber thus included 5 temperature zones, of which the lowermost zone 1 was maintained at a temperature of 70° C., the following zones being maintained at 70° C., 75° C., 83° C. and 15° C., respectively.

The product leaving the reactor was separated in a gas separator cooled to 5° C. into a liquid and a gaseous phase, 108 normal liters off-gas and 8940 grams of peracetic acid solution being withdrawn per hour from the separator. One third of the off-gas was formed of $CO_2$ and the balance consisted substantially of oxygen and relatively small amounts of nitrogen and methane. The peracetic acid solution was found to contain 20.3% by weight peracetic acid, 4.35% by weight acetic acid, and 1.6% acetaldehyde.

The peracetic acid solution so obtained could directly be used further, if desired after the addition of a stabilizer. It is also possible to free the peracetic acid solution in a distilling column from unreacted acetaldehyde. To this end, the solution was distilled under a pressure of 300 mm. mercury in a distilling column with altogether 12 trays. The column was heated to ensure that the temperature prevailing in the bottom of the column did not exceed 60° C., in order to avoid losses in active oxygen. At a reflux ratio of 1:6, 290 grams head product were withdrawn per hour, of which 50% was acetaldehyde which was oxidized anew to produce peracetic acid.

We claim:

1. In the process for the manufacture of anhydrous solution of peracetic acid, wherein acetaldehyde is oxidized in the liquid phase in an inert solvent with heating and under pressure; the improvement which comprises oxidizing the acetaldehyde in liquid phase within a period not exceeding about 10 minutes by thoroughly admixing a solution of acetaldehyde in an inert solvent with at least the equivalent quantity of a member selected from the group consisting of oxygen and an oxygen-containing gas, effecting the reaction at a temperature higher than 60° C. up to about 110° C. and under a pressure greater than 1 atmosphere gauge; and thereafter cooling the resulting material to a temperature of less than about 20° C. to affect a condition whereby the content of solvent vapors in the oxygen-containing off-gas is below the lower limit of ignition of the solvent present in admixture with the oxygen.

2. The process of claim 1, wherein the cooled reaction mixture is distilled to free it from small proportions of unreacted acetaldehyde.

3. The process of claim 1, wherein the acetaldehyde solution is oxidized at a temperature of about 70 to 90° C.

4. The process of claim 1, wherein the oxidation is carried out under a pressure of about 2 to 6 atmospheres gauge.

5. The process of claim 1, wherein a turbulent flow corresponding to a Reynold number of at least 10,000 is conferred upon the starting mixture.

6. The process of claim 1, wherein the reaction components are oxidized within a period of time of about 30 seconds to 10 minutes.

7. The process of claim 1, wherein the inert solvent is at least one member selected from the group consisting of ethyl acetate, acetone and methylethylketone.

8. The process of claim 1, wherein the reaction mixture is cooled down to a temperature of −10 to +5° C.

9. The process of claim 1 wherein the cooled reaction mixture is admixed with a stabilizer for peracetic acid.

References Cited

UNITED STATES PATENTS

| 3,192,256 | 6/1965 | Maclean et al. |
| 3,228,977 | 1/1966 | Sennewald et al. |

FOREIGN PATENTS

| 732,225 | 4/1966 | Canada. |
| 892,631 | 3/1962 | Great Britain. |
| 992,017 | 5/1965 | Great Britain. |
| 1,165,009 | | Germany. |

BERNARD HELFIN, Primary Examiner

W. B. LONE, Assistant Examiner